(12) United States Patent
Ebrahimi et al.

(10) Patent No.: US 10,564,376 B2
(45) Date of Patent: *Feb. 18, 2020

(54) FIBER OPTIC INTERIOR DISTRIBUTION CABINETS

(71) Applicant: AFL Telecommunications LLC, Duncan, SC (US)

(72) Inventors: Vahid Ebrahimi, Simpsonville, SC (US); Shirley Ball, Greer, SC (US); William Miller, Easley, SC (US); Kelly Laffere, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,724

(22) Filed: Jan. 24, 2019

(65) Prior Publication Data
US 2019/0196126 A1    Jun. 27, 2019

Related U.S. Application Data

(63) Continuation of application No. 15/498,654, filed on Apr. 27, 2017, now Pat. No. 10,197,756.

(60) Provisional application No. 62/455,252, filed on Feb. 6, 2017.

(51) Int. Cl.
  *G02B 6/44* (2006.01)
  *G02B 6/38* (2006.01)

(52) U.S. Cl.
  CPC ......... *G02B 6/4447* (2013.01); *G02B 6/3897* (2013.01); *G02B 6/445* (2013.01); *G02B 6/4452* (2013.01); *G02B 6/4477* (2013.01)

(58) Field of Classification Search
  None
  See application file for complete search history.

(56) References Cited

U.S. PATENT DOCUMENTS

| | | | |
|---|---|---|---|
| 5,824,961 A | 10/1998 | Burek | |
| 5,933,563 A | 8/1999 | Schaffer | |
| 6,351,592 B1 | 2/2002 | Ehn | |
| 6,591,053 B2 * | 7/2003 | Fritz | G02B 6/3897 385/135 |
| 6,603,660 B1 | 8/2003 | Ehn | |
| 10,197,756 B2 * | 2/2019 | Ebrahimi | G02B 6/3897 |
| 2006/0228086 A1 | 10/2006 | Holmberg | |

(Continued)

OTHER PUBLICATIONS

AFL Telecommunications LLC; International Patent Application No. PCT/US2018/016808; International Search Report; dated May 11, 2018; (3 pages).

*Primary Examiner* — Chad H Smith
(74) *Attorney, Agent, or Firm* — Dority & Manning, P.A.

(57) ABSTRACT

A interior distribution cabinet includes a body defining an interior, the interior including a provider portion and a subscriber portion. The body further defines a subscriber cable entry slot, the subscriber cable entry slot disposed in a portion of the body defining the subscriber portion. The interior distribution cabinet further includes a first door selectively providing access to the provider portion, and a second door selectively providing access to the subscriber portion. The interior distribution cabinet further includes a connector storage tray disposed within the subscriber portion, the connector storage tray including a tray body defining a plurality of connector slots.

15 Claims, 4 Drawing Sheets

(56) References Cited

U.S. PATENT DOCUMENTS

| | | | |
|---|---|---|---|
| 2011/0268411 A1* | 11/2011 | Giraud | G02B 6/4452 |
| | | | 385/135 |
| 2012/0093473 A1 | 4/2012 | Cox | |
| 2014/0248027 A1 | 9/2014 | Solheid | |
| 2014/0301709 A1* | 10/2014 | Matz | G02B 6/4452 |
| | | | 385/135 |
| 2016/0073181 A1 | 3/2016 | Anniati | |
| 2016/0091683 A1* | 3/2016 | Carapella | G02B 6/4448 |
| | | | 385/135 |
| 2016/0238811 A1 | 8/2016 | Simmons | |
| 2016/0282577 A1 | 9/2016 | Chang | |

* cited by examiner

FIBER OPTIC INTERIOR DISTRIBUTION CABINETS

CROSS REFERENCE TO RELATED APPLICATIONS

This application is a continuation of U.S. patent application Ser. No. 15/498,654, filed on Apr. 27, 2017, which claims the benefit of priority to U.S. Provisional Patent Application No. 62/455,252, filed on Feb. 6, 2017, the disclosures of all of which are incorporated by reference herein in their entireties.

FIELD OF THE INVENTION

The present disclosure relates generally to interior distribution cabinets for use with fiber optic cables.

BACKGROUND OF THE INVENTION

Interior distribution cabinets have been utilized for optical fiber cable connections in environments such as multi-dwelling units. Typically, the distribution cabinet is located inside the dwelling. A cable (i.e. a drop cable) is brought to the distribution cabinet from outside of the building, and extended into the distribution cabinet. Fibers, such as optical fibers, of the cable can be prepared in the e distribution cabinet for later connection to optical fibers which provide service to individual users, i.e. subscribers.

However, known interior distribution cabinets may have disadvantages. For example, currently known interior distribution cabinets lack organizer components for organizing unused subscriber side connectors. Further, currently known interior distribution cabinets are relatively large, limiting their use and versatility in space-limited areas. Still further, currently known interior distribution cabinets are complicated to use.

Accordingly, improved interior distribution cabinets would be desired. For example, interior distribution cabinets which include organizer components and which are relatively small and simple to use, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, an interior distribution cabinet is provided. The interior distribution cabinet includes a body defining an interior, the interior including a provider portion and a subscriber portion. The body further defines a subscriber cable entry slot, the subscriber cable entry slot disposed in a portion of the body defining the subscriber portion. The interior distribution cabinet further includes a first door selectively providing access to the provider portion, and a second door selectively providing access to the subscriber portion. The interior distribution cabinet further includes a connector storage tray disposed within the subscriber portion, the connector storage tray including a tray body defining a plurality of connector slots.

In accordance with another embodiment of the present disclosure, an interior distribution cabinet is provided. The interior distribution cabinet includes a body defining an interior, the interior including a provider portion and a subscriber portion. The body further defines a plurality of subscriber cable entry slots, each of the plurality of subscriber cable entry slots disposed in a portion of the body defining the subscriber portion and extending from a front edge of the body towards a rear wall of the body along a transverse axis. The interior distribution cabinet further includes a first door selectively providing access to the provider portion, and a second door selectively providing access to the subscriber portion. The interior distribution cabinet further includes a connector storage tray disposed within the subscriber portion, the connector storage tray formed from a foam and including a tray body defining a plurality of connector slots.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is directed generally to improved interior distribution cabinets. Interior distribution cabinets in accordance with the present disclosure may advantageously provide one or more of the following advantages: organized and managed connectors on the customer/subscriber side; easy identification and access to terminations stored in the customer/subscriber side; reduction in the overall size of the cabinet, expanding the use and versatility in space-limited areas; easy to use while being highly functional.

Interior distribution cabinets in accordance with embodiments of the present disclosure are generally fiber management boxes for bringing optical fiber cables (i.e. drop cables) from outside of a building, such as a multi-unit dwelling, plant, etc. into the building. Interior distribution cabinets are located inside such dwellings. An input cable, such as a drop cable, enters a provider side of the cabinet. One or more subscriber cables, which may extend to individual customers/subscribers, enter a subscriber side of the cabinet. Within the cabinet, optical fiber(s) of the subscriber cables may be selectively connected to optical fiber(s) of the input cable to provide service to subscribers.

Referring now to FIGS. 1 through 4, embodiments of interior distribution cabinets 10 in accordance with the present disclosure are provided. An interior distribution cabinet 10 includes a body 12 which defines an interior 14. The interior 14 may, as shown, include a provider portion 16 and a subscriber portion 18. The provider portion 16 and subscriber portion 18 may be separate portions of the interior 14, and may be separated from each other by a bulkhead 20 which defines the provider portion 16 and subscriber portion 18 within the body 12.

Body 12 may include various walls which form the periphery of the body 12 and define the interior 14. For example, body 12 may include one or more of a top wall 22, a bottom wall 24, a first sidewall 26, a second sidewall 28, and a rear wall 30. The top wall 22 and bottom wall 24 may be spaced apart along a vertical axis V, such that the top wall 22 is above the bottom wall 24 and the interior 14 is defined between the top wall 22 and bottom wall 24. The first sidewall 26 and second sidewall 28 may be spaced apart along a lateral axis L, such that the interior 14 is defined between the first sidewall 26 and second sidewall 28. The body 12 may further include a front edge 32 and a rear edge 34. The front edge 32 and rear edge 34 may be spaced apart along a transverse axis T, such that the interior 14 is defined between the front edge 32 and rear edge 34. Rear wall 30 may be positioned at the rear edge 34 and spaced form the front edge 32, and may extend vertically between the top wall 22 and bottom wall 24 and laterally between the first sidewall 26 and second sidewall 28.

It should be noted that the vertical axis V, lateral axis L, and transverse axis T are each perpendicular to each other and thus mutually orthogonal, defining a coordinate system for the body 12.

Cabinet 10 further includes a first door 40 and a second door 44. The first door 40 is movable between an open position (FIGS. 2-4) and a closed position (FIG. 1), and selectively provides access to the provider portion 16 of the interior 14. For example, the first door 40 prevents access to the provider portion 16 when in the closed position and provides access to the provider portion 16 when in the open position. The second door 44 is movable between an open position (FIGS. 2-4) and a closed position (FIG. 1), and selectively provides access to the subscriber portion 18 of the interior 14. For example, the second door 44 prevents access to the subscriber portion 18 when in the closed position and provides access to the subscriber portion 18 when in the open position.

First door 40 may include a first panel 42. When in the closed position, the first panel 42 may contact the front edge 32. Second door 44 may include a second panel 46. When in the closed position, the second panel 46 may contact the front edge 32. Further, in exemplary embodiments, second door 44 may include the second sidewall 28. Second sidewall 28 and second panel 46 may be positioned perpendicular to each other and may be connected to each other. Second sidewall 28 when in the closed position may contact the top wall 22 and bottom wall 24.

In exemplary embodiments, the first door 40 and second door 44 may each be rotatable between their respective open and closed positions. For example, first door 40 and second door 44 may each be rotatable about the vertical axis V between their respective open and closed positions. In exemplary embodiments, a first hinge 41 of the first door 40 which rotatably connects the first door 40 to the body 12 is disposed at the front edge 32 of the body 12, such as between the first sidewall 26 and first panel 42. In exemplary embodiments, a second hinge 45 of the second door 40 which rotatably connects the second door 44 to the body 12 is disposed at the rear edge 34 of the body 12, such as between the second sidewall 28 and the rear wall 30. Such positioning of the second hinge 45 in these embodiments is particularly advantageous as it provides increased access to the subscriber portion 18 and associated ease of access to internal components when connecting subscriber cables to the input cable.

An input cable port 50 may be defined in the body 12, such as in the top wall 22 and/or bottom wall 24 thereof, for an input cable 52 to enter the body 12 and specifically the provider portion 16 of the interior 14. Input cable port 50 may thus be in communication with the provider portion 16. In exemplary embodiments, punch-out portions 54 of the body 12 may selectively cover the input cable port 50, and a user may remove one or more portions 54 to reveal the port 50 having an appropriate size for the associated input cable 52. When an input cable 52 is extended through the input cable port 50 and into the provider portion 16, a compression fitting 56 may be connected to the cable 52 to secure the input cable 52 to the body 12. Within the provider portion 16, optical fibers 58 of the input cable 52 may be exposed from outer layers (such as buffer tubes and outer jackets) of the input cable 52 for connection as discussed herein. Notably, an exposed optical fiber 58 may still include outer cladding, jacket, and/or other layers.

Figure 5:
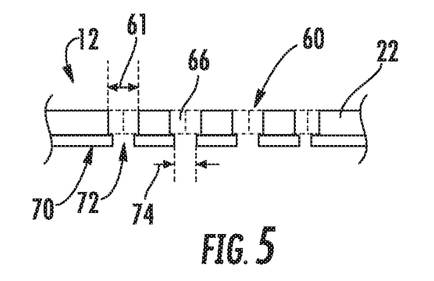
FIG. 5 is a close-up front view of slots and a strain relief bracket of an interior distribution cabinet in accordance with embodiments of the present disclosure.

Referring now additionally to FIG. 5, one or more subscriber entry slots 60 (such as in exemplary embodiments a plurality of subscriber entry slots 60) may be defined in the body 12, such as in the top wall 22 thereof, for subscriber cables 62 to enter the body 12 and specifically the subscriber portion 18 of the interior 14. The subscriber entry slots 60 may thus be disposed in a portion of the body 12, such as a portion of the top wall 22, which defines the subscriber portion 18. Subscriber cables 62 may be extended through the subscriber entry slot(s) 60 and into the subscriber portion 18. Within the subscriber portion 18, optical fibers 64 of the subscriber cables 62 may be exposed from outer layers (such as buffer tubes and outer jackets) of the subscriber cables 62 for connection as discussed herein. Notably, an exposed optical fiber 64 may still include outer cladding, jacket, and/or other layers.

In exemplary embodiments, the subscriber cable entry slot(s) 60 are defined in the top wall 22. Further, in exemplary embodiments, the subscriber cable entry slot(s) 60 extend from and are accessible through the front edge 32. For example, each subscriber cable entry slot 60 may extend from the front edge 32 towards the rear edge 34 and rear wall 30 along the transverse axis T. Such positioning of the subscriber cable entry slot(s) 60 in these embodiments is particularly advantageous, as it facilitates ease of accessibility to the slot(s) 60 and ease of loading of subscriber cables 62 into the slot(s) 60.

In exemplary embodiments, a foam 66 may be disposed within each subscriber cable entry slot 60. The foam 66 may advantageously cushion and provide strain relief to the cables 62 within the slot 60, and may further assist with securing the cables 62 within the slot 60. In exemplary embodiments, urethane foam may be utilized.

In exemplary embodiments, a strain relief bracket 70 may be provided for further securing and providing strain relief to the cables 62 entering subscriber portion 18. For example, strain relief bracket 70 may be disposed within the subscriber portion 18 and may be in contact with the body 12, such as the top wall 22 thereof. Strain relief bracket 70 may include one or more strain relief slots 72 defined in a body 74 of the bracket 70, and each strain relief slot 72 may be in communication with a subscriber cable entry slot 60. Accordingly, a subscriber cable 62 extending through a slot 60 may further extend through a slot 72 when entering the subscriber portion 18.

In exemplary embodiments, a width 74 of each slot 72 (along the lateral axis L as shown) may be less than a width 61 of the associated subscriber cable entry slot 60 with which the slot 72 is in communication. Further, in exemplary embodiments, the width 74 of each slot 72 may be less than the maximum width 63 of the subscriber cables 62 being extended therethrough. The outermost layers of such cables 62 may be flexible to allow the cables 62 to fit tightly within the slots 72. The relatively smaller widths 74 of the slots 72 may secure the cables 62 therein and provide strain relief to the cables 62.

In exemplary embodiments, foam 66 may further be disposed within slots 72.

Within the interior 14, optical fibers 58 of input cable 52 and optical fibers 64 of the subscriber cables 62 may be terminated and connectorized. Accordingly, suitable connectors 80 may be connected to the ends of optical fibers 58 and optical fibers 64. These connectors 80 may facilitate the selective connection between the optical fibers 58, 64 to provide service to a subscriber as desired and as discussed herein.

Cabinet 10 may further include a connector storage tray 90. The connector storage tray 90 may be disposed within the subscriber portion 18, and may accommodate therein connectors 80 of optical fibers 64 that are not connected to optical fibers 58. Connector storage tray 90 may thus advantageously provide an organized and easy to use location for storage of un-used optical fibers 64 and connectors 80 thereof.

Connector storage tray 90 may include a tray body 92 which defines a plurality of connector slots 94. The slots 94 may be arranged in the body 92 in a plurality of rows and columns, as shown. Notably, the number of rows and columns may correspond to (and thus be equal to or greater than) the maximum number of optical fibers 64 which can be connected within the cabinet 10. A connector 80 may be inserted into a slot 94 for temporary storage thereof.

In exemplary embodiments, connector storage tray 90 may be formed from a foam. In exemplary embodiments, the foam of connector storage tray 90 may have a hardness that is relatively greater than a hardness of the foam 66. In exemplary embodiments, urethane foam may be utilized.

Figure 1:
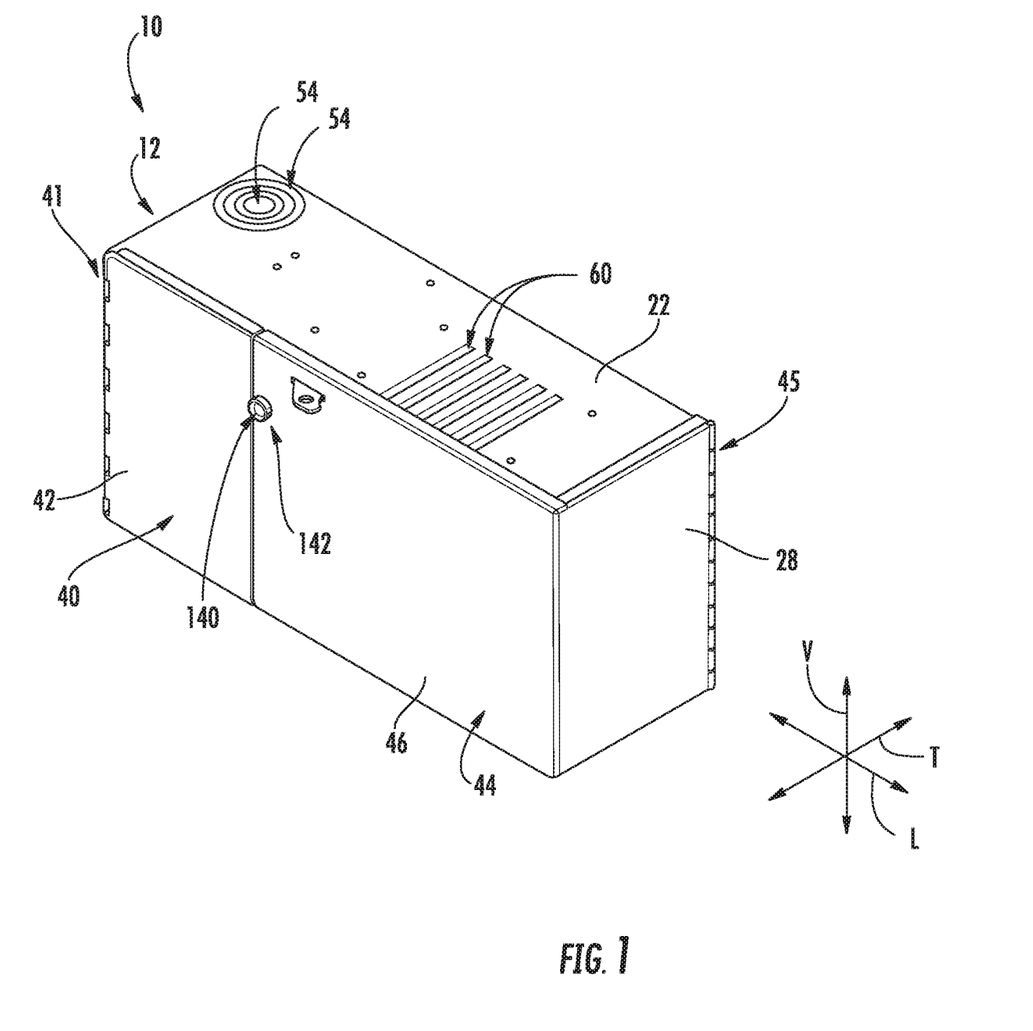
FIG. 1 is a perspective view of an interior distribution cabinet, with first and second doors in closed positions, in accordance with embodiments of the present disclosure.
Figure 2:
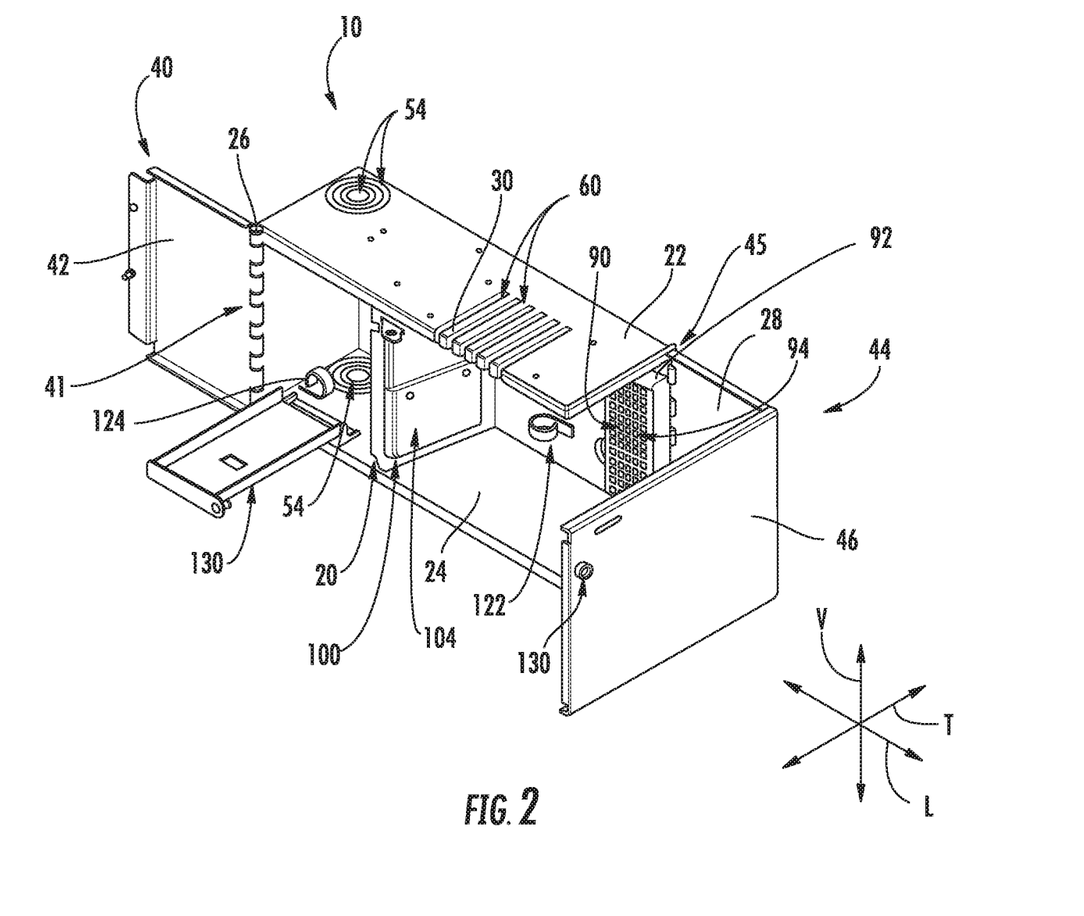
FIG. 2 is a perspective view of an interior distribution cabinet, with first and second doors in open positions and a splice tray holder in an open position, in accordance with embodiments of the present disclosure.
Figure 3:
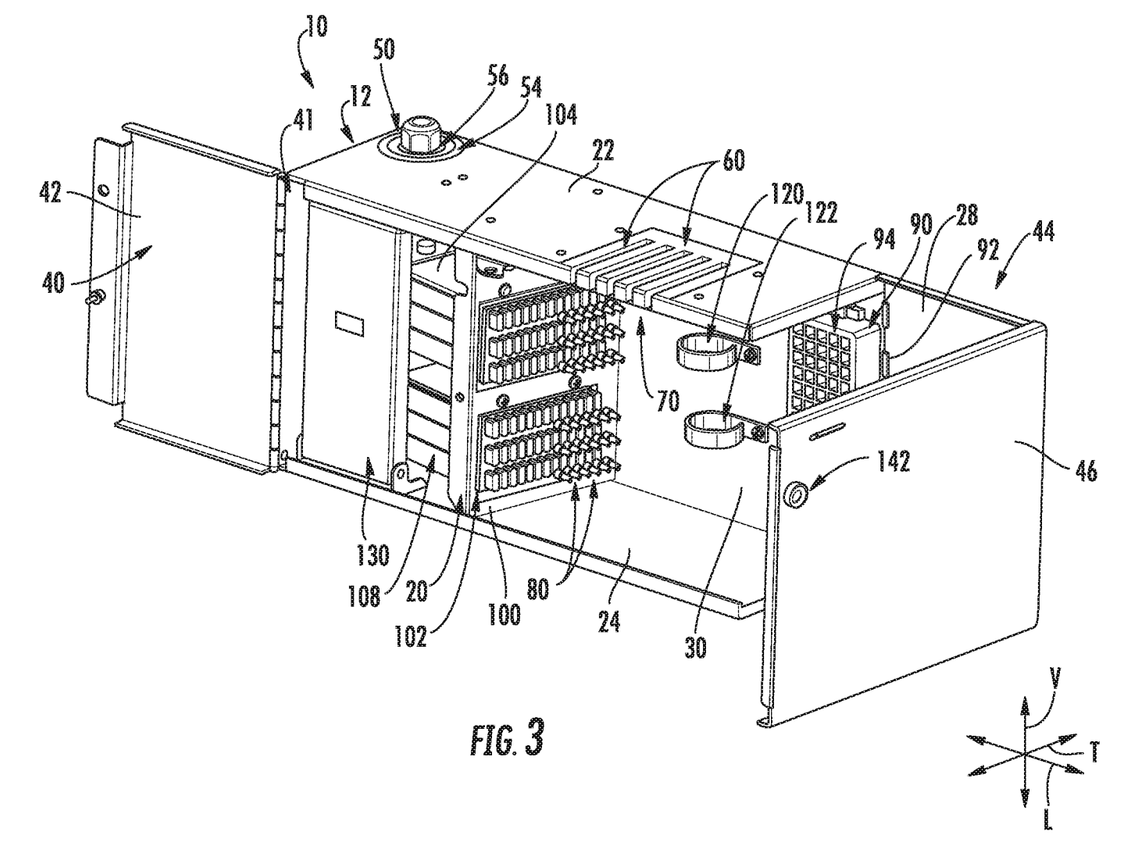
FIG. 3 is a perspective view of an interior distribution cabinet, with first and second doors in open positions, a splice tray holder in a closed position, and optical splitters extending through a bulkhead, in accordance with embodiments of the present disclosure.
Figure 4:
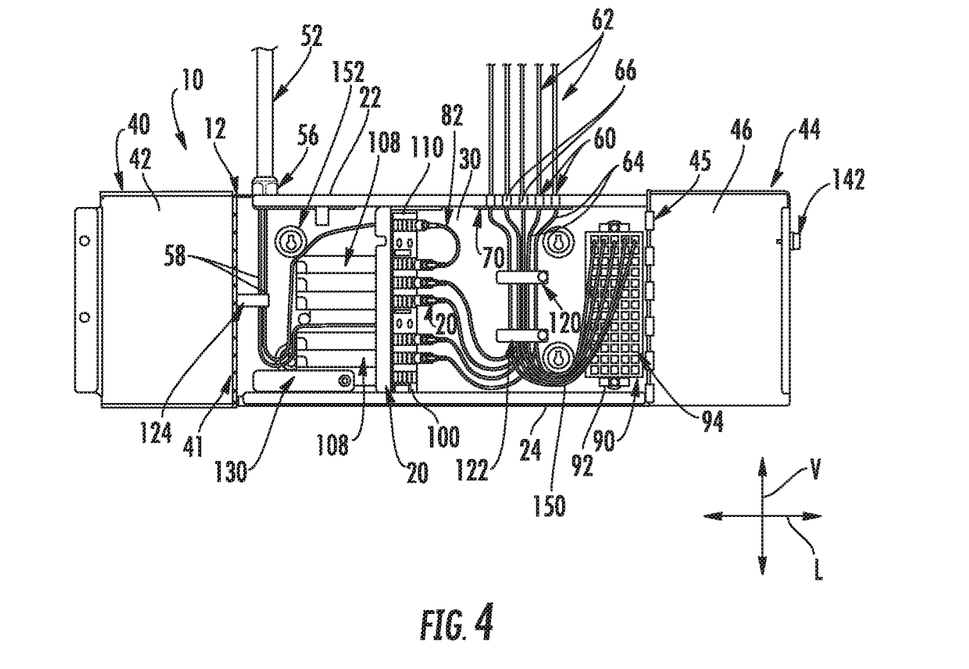
FIG. 4 is a front view of an interior distribution cabinet illustrating fiber optic cable routing in accordance with embodiments of the present disclosure.

As discussed, cabinet 10 may include a bulkhead 20 disposed within the interior 14. The bulkhead 20 may be disposed between and define the provider portion 16 and the subscriber portion 18. Bulkhead 20 may include a fixed body 100 which is disposed between and defines the provider portion 16 and the subscriber portion 18. One or more openings 102 may be defined in the fixed body 100, as shown. Openings 102 may provide access between the provider portion 16 and the subscriber portion 18. One or more support panels 104 may be connected to the fixed body 100 in select positions to allow or prevent access through the openings 102. For example, FIG. 2 illustrates support panels 104 connected to the fixed body 100 in a position to prevent access through the openings 102. FIGS. 3 and 4 illustrate support panels 104 connected to the fixed body 100 in a position to allow access through the openings 102.

Cabinet 10 may further include one or more optical splitters 180, and may additionally or alternatively include one or more adapters 110. Each optical splitter 108 may be disposed on the bulkhead 20. Each optical splitter 108 may, for example, be mounted on a support panel 104, and may be selectively positioned to extend through an opening 102 (as shown in FIGS. 3 and 4). An optical splitter 108 may, as is generally understood, split a single optical input into multiple optical outputs. Accordingly, an optical fiber 58 of input cable 52 may be directly or indirectly connected to a splitter 108 and may provide an optical input to the splitter 108, while optical fibers 64 may be selectively connected to splitter 108 as optical outputs of the splitter 108.

In some embodiments, an optical fiber 58 may be directly connected to a splitter 108. In these embodiments, the connector 80 of the optical fiber 58 may be directly inserted into the splitter 108 to cause such connection.

In alternative embodiments, an optical fiber 58 may be indirectly connected to a splitter 108. In these embodiments, the connector 80 of the optical fiber 58 may be directly inserted into an adapter 110. The adapter 110 may be disposed on the bulkhead 20. Adapter 110 may, for example, extend through an opening 102. An optical fiber of a jumper cable 82 may be directly connected at one end to the adapter 110 (via a connector 80) and at the other end to the splitter 100. Accordingly, the optical input in these embodiments may be provided by the optical fiber 58 via jumper cable 82.

As discussed, unused optical fibers 64 and connectors 80 thereof may be held and organized in connector storage tray 90. When a subscriber connection is required, the necessary optical fiber 64 and connector 80 thereof may simply be removed from the connector storage tray 90 and inserted into the splitter 108 (or alternatively, an adapter), thus causing an optical connection to be formed with an input optical fiber 58.

Figure 6:
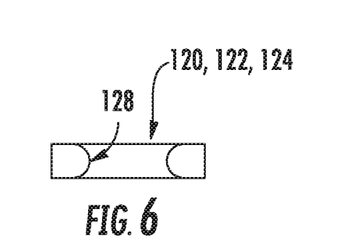
FIG. 6 is a close-up sectional view of a routing ring of an interior distribution cabinet in accordance with embodiments of the present disclosure.

Referring now additionally to FIG. 6, cabinet 10 may further include one or more routing rings for organizing, routing, and bundling cables within the interior 14. One or more routing rings may be disposed within subscriber portion 18, and one or more routing rings may be disposed within provider portion 16. For example, as illustrated a first routing ring 120 and a second routing ring 122 may be disposed within the subscriber portion 18. Cables 62 and optical fibers 64 thereof may be routed through one or both of the first routing ring 120 and second routing ring 122 within the subscriber portion 18. Routing rings 120, 122 may advantageously provide bend radius control, thus reducing or preventing optical losses due to bending.

In exemplary embodiments, the first routing ring 120 and second routing ring 122 may be spaced apart from each other along the vertical axis V. For example, as shown, first routing ring 120 may be spaced above second routing ring 122 along the vertical axis V. Additionally or alternatively, the first routing ring 120 and second routing ring 122 may be spaced apart from each other along the transverse axis T. For example, the first routing ring 120 may be offset from the rear wall 30 and the second routing ring 122 along the transverse axis T. In other words, the first routing ring 120 may be spaced farther from the rear wall 30 than the second routing ring 122 along the transverse axis T.

As illustrated, a third routing ring 124 may be disposed within the provider portion 16. Cables 52 and optical fibers 58 thereof may be routed through the third routing ring 124 within the provider portion 16.

In some embodiments, as illustrated in FIG. 6, one or more of the routing rings 120, 122, 124 may have a convex inner surface 128. Such convex inner surface 128 may advantageously provide strain relief and guidance to the cables extending through the routing ring. Alternatively, however, the inner surface 128 of a routing ring may be flat or concave.

Cabinet 10 may further include a splice tray holder 130. Splice tray holder 130 may serve to accommodate a splice tray mounted thereon. As shown, splice tray holder 130 may be connected to body 12 within the provider portion 16. Splice tray holder 130 may movable, such as rotatable, between an open position (FIG. 2) and a closed position (FIG. 3). In the open position, the splice tray holder 130 may extend from the provider portion 16. In the closed position, the splice tray holder 130 may be positioned entirely within the provider portion 16.

Cabinet 10 may further include a locking bolt 140 which extends through the first door 40 and the second door 44, such as the first panel 42 and the second panel 46, to securely lock the first door 40 and second door 44 in their respective closed positions. The locking bolt 140 may, for example, further extend into and releasable (such as threadably) connect with the bulkhead 20 to securely lock the first door 40 and second door 44. Alternatively, the locking bolt 140 may extend through a suitable flange or other component of the cabinet 10 to facilitate such locking. A collar 132 may extend outwardly from the second door 44, such as the second panel 46 thereof, and may thus be disposed on an exterior of the cabinet 10. When the bolt 140 is inserted through the second door 44, an exterior portion of the bolt 140 (i.e. the head) may be disposed within the collar 142, and the collar 142 may thus limit access to the bolt 140. Only technicians with appropriate tools may thus access the bolt 140 within the collar 142 to unlock the second door 44, first door 42, and cabinet 10 generally and provide access thereto.

Cabinet 10 may further include first and second keyholes 150, 152 defined in the body 12, such as in the rear wall 30. The keyholes 150, 152 may facilitate mounting of the cabinet 10 on, for example, a wall or other mounting component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An interior distribution cabinet, comprising:
   a body defining an interior, the interior comprising a provider portion and a subscriber portion, the body further defining a plurality of subscriber cable entry slots, the plurality of subscriber cable entry slots disposed in a portion of the body defining the subscriber portion;
   a first door selectively providing access to the provider portion;
   a second door selectively providing access to the subscriber portion;
   a connector storage tray disposed within the subscriber portion, the connector storage tray comprising a tray body defining a plurality of connector slots; and
   a strain relief bracket disposed within the subscriber portion and in contact with the body, the strain relief bracket defining a plurality of strain relief slots, each strain relief slot in communication with a corresponding one of the plurality of subscriber cable entry slots, wherein a width of each strain relief slot of the plurality of strain relief slots is less than a width of the corresponding one of the plurality of subscriber cable entry slots, and wherein each of the subscriber cable entry slots is aligned with a corresponding one of the plurality of strain relief slots;
   wherein a foam is disposed within each subscriber cable entry slot of the plurality of subscriber cable entry slots.

2. The interior distribution cabinet of claim 1, wherein the body includes a top wall and a bottom wall spaced apart along a vertical axis and a first sidewall and a second sidewall spaced apart along a lateral axis, and wherein the subscriber cable entry slot is defined in the top wall and extends from a front edge of the body towards a rear wall of the body along a transverse axis, wherein the vertical axis, lateral axis, and transverse axis are mutually orthogonal.

3. The interior distribution cabinet of claim 1, wherein the tray body is formed from a foam.

4. The interior distribution cabinet of claim 1, further comprising a bulkhead disposed within the interior, the bulkhead disposed between and defining the provider portion and the subscriber portion.

5. The interior distribution cabinet of claim 4, further comprising an optical splitter disposed on the bulkhead.

6. The interior distribution cabinet of claim 4, further comprising an optical fiber adapter disposed on the bulkhead.

7. The interior distribution cabinet of claim 1, wherein the first door and the second door are each rotatable about a vertical axis between an open position and a closed position, wherein a first hinge of the first door is disposed at a front edge of the body, and wherein a second hinge of the second door is disposed at a rear edge of the body.

8. The interior distribution cabinet of claim 1, further comprising a first routing ring and a second routing ring disposed in the subscriber portion, the first routing ring positioned above the second routing ring along a vertical axis and offset from a rear wall of the body and the second routing ring along a transverse axis.

9. An interior distribution cabinet, comprising:
   a body defining an interior, the interior comprising a provider portion and a subscriber portion, the body further defining a plurality of subscriber cable entry slots, each of the plurality of subscriber cable entry slots disposed in a portion of the body defining the subscriber portion and extending from a front edge of the body towards a rear wall of the body along a transverse axis;

a first door selectively providing access to the provider portion;

a second door selectively providing access to the subscriber portion;

a connector storage tray disposed within the subscriber portion, the connector storage tray formed from a foam and comprising a tray body defining a plurality of connector slots;

a strain relief bracket disposed within the subscriber portion and in contact with the body, the strain relief bracket defining a plurality of strain relief slots, each of the plurality of strain relief slots in communication with one of the plurality of subscriber cable entry slots; and a first routing ring and a second routing ring disposed in the subscriber portion, the first routing ring positioned above and in alignment with the second routing ring along a vertical axis and offset from a rear wall of the body and the second routing ring along the transverse axis;

wherein a foam is disposed within each subscriber cable entry slot of the plurality of subscriber cable entry slots.

10. The interior distribution cabinet of claim 9, wherein the body includes a top wall and a bottom wall spaced apart along the vertical axis and a first sidewall and a second sidewall spaced apart along a lateral axis, wherein the subscriber cable entry slot is defined in the top wall, and wherein the vertical axis, lateral axis, and transverse axis are mutually orthogonal.

11. The interior distribution cabinet of claim 9, wherein a width of each of the plurality of strain relief slots is less than a width of each of the plurality of subscriber cable entry slots.

12. The interior distribution cabinet of claim 9, further comprising a bulkhead disposed within the interior, the bulkhead disposed between and defining the provider portion and the subscriber portion.

13. The interior distribution cabinet of claim 12, further comprising an optical splitter disposed on the bulkhead.

14. The interior distribution cabinet of claim 12, further comprising an optical fiber adapter disposed on the bulkhead.

15. The interior distribution cabinet of claim 9, wherein the first door and the second door are each rotatable about the vertical axis between an open position and a closed position, wherein a first hinge of the first door is disposed at a front edge of the body, and wherein a second hinge of the second door is disposed at a rear edge of the body.

* * * * *